US006006169A

United States Patent [19]

Sandhu et al.

[11] Patent Number: 6,006,169

[45] Date of Patent: Dec. 21, 1999

[54] METHOD AND APPARATUS FOR TRIMMING AN INTEGRATED CIRCUIT

[75] Inventors: Bal S. Sandhu, Fremont, Calif.; Jack D. Pippin, Portland; Edward A. Burton, Hillsboro, both of Oreg.

[73] Assignee: Intel Corporation, Santa Clara, Calif.

[21] Appl. No.: 09/001,606

[22] Filed: Dec. 31, 1997

[51] Int. Cl.[6] .................... G01K 1/00

[52] U.S. Cl. .................... 702/132; 327/83

[58] Field of Search .................... 702/130, 132, 702/99; 341/121; 327/83; 361/140

[56] References Cited

U.S. PATENT DOCUMENTS

| | | | |
|---|---|---|---|
| 4,967,197 | 10/1990 | Peng . | |
| 4,987,379 | 1/1991 | Hughes . | |
| 5,043,692 | 8/1991 | Sites et al. | 338/28 |
| 5,334,891 | 8/1994 | Marbot . | |
| 5,408,885 | 4/1995 | Araki . | |
| 5,477,182 | 12/1995 | Huizer . | |
| 5,519,354 | 3/1996 | Audy | 327/512 |
| 5,537,581 | 7/1996 | Conary et al. . | |
| 5,546,568 | 8/1996 | Bland et al. . | |
| 5,550,512 | 8/1996 | Fukahori . | |
| 5,608,347 | 3/1997 | Kearney | 327/512 |
| 5,608,348 | 3/1997 | Kearney et al. | 327/538 |
| 5,619,122 | 4/1997 | Kearney et al. | 323/312 |
| 5,631,603 | 5/1997 | Stubbe et al. . | |
| 5,760,720 | 6/1998 | Nolan et al. | 341/120 |
| 5,781,060 | 7/1998 | Sugawara . | |
| 5,798,637 | 8/1998 | Kim et al. | 323/313 |
| 5,821,741 | 10/1998 | Brokaw | 323/311 |
| 5,822,017 | 10/1998 | Mok . | |
| 5,838,578 | 11/1998 | Pippin | 364/488 |
| 5,873,053 | 2/1999 | Pricer et al. | 702/130 |

OTHER PUBLICATIONS

Sanchez et al., *Thermal Management System for High Performance PowerPC™ Microprocessors*, IEEE (1997).

*Primary Examiner*—Patrick Assouad
*Attorney, Agent, or Firm*—Trop, Pruner, Hu & Miles, P.C.

[57] ABSTRACT

An integrated circuit has circuitry formed by a fabrication process. The circuitry has an electrical characteristic that is different from a predetermined value due to variations in the fabrication process. The electrical characteristic is responsive to a level of a current, and a current source of the integrated circuit is configured to be selectably enabled to adjust the level of the current to move the electrical characteristic closer to the predetermined value.

23 Claims, 8 Drawing Sheets

| Step # of Cal. Seq. | Calibration Routine | | | | | | | | State of Thermal_Trip |
|---|---|---|---|---|---|---|---|---|---|
| | SELA[3:0]# | | | | SELB[3:0]# | | | | |
| **0** | **1** | **1** | **1** | **1** | **1** | **1** | **1** | **1** | **0** |
| 1 | 1 | 1 | 1 | 1 | 1 | 1 | 1 | 0 | 0 |
| 2 | 1 | 1 | 1 | 1 | 1 | 1 | 0 | 1 | 0 |
| 3 | 1 | 1 | 1 | 1 | 1 | 1 | 0 | 0 | 0 |
| 4 | 1 | 1 | 1 | 1 | 1 | 0 | 1 | 1 | 0 |
| 5 | 1 | 1 | 1 | 1 | 1 | 0 | 1 | 0 | 0 |
| 6 | 1 | 1 | 1 | 1 | 1 | 0 | 0 | 1 | 0 |
| 7 | 1 | 1 | 1 | 1 | 1 | 0 | 0 | 0 | 0 |
| 8 | 1 | 1 | 1 | 1 | 0 | 1 | 1 | 1 | 0 |
| 9 | 1 | 1 | 1 | 1 | 0 | 1 | 1 | 0 | 0 |
| 10 | 1 | 1 | 1 | 1 | 0 | 1 | 0 | 1 | 0 |
| 11 | 1 | 1 | 1 | 1 | 0 | 1 | 0 | 0 | 0 |
| 12 | 1 | 1 | 1 | 1 | 0 | 0 | 1 | 1 | 0 |
| 13 | 1 | 1 | 1 | 1 | 0 | 0 | 1 | 0 | 0 |
| 14 | 1 | 1 | 1 | 1 | 0 | 0 | 0 | 1 | 0 |
| 15 | 1 | 1 | 1 | 1 | 0 | 0 | 0 | 0 | 1 |

Figure 6

| Step # of Cal. Seq. | Calibration Routine | | | | | | | | State of Thermal_Trip |
|---|---|---|---|---|---|---|---|---|---|
| | SELA[3:0]# | | | | SELB[3:0]# | | | | |
| **15** | **1** | **1** | **1** | **1** | **0** | **0** | **0** | **0** | **0** |
| 16 | 1 | 1 | 1 | 0 | 0 | 0 | 0 | 0 | 0 |
| 17 | 1 | 1 | 0 | 1 | 0 | 0 | 0 | 0 | 0 |
| 18 | 1 | 1 | 0 | 0 | 0 | 0 | 0 | 0 | 0 |
| 19 | 1 | 0 | 1 | 1 | 0 | 0 | 0 | 0 | 0 |
| 20 | 1 | 0 | 1 | 0 | 0 | 0 | 0 | 0 | 0 |
| 21 | 1 | 0 | 0 | 1 | 0 | 0 | 0 | 0 | 0 |
| 22 | 1 | 0 | 0 | 0 | 0 | 0 | 0 | 0 | 0 |
| 23 | 0 | 1 | 1 | 1 | 0 | 0 | 0 | 0 | 0 |
| 24 | 0 | 1 | 1 | 0 | 0 | 0 | 0 | 0 | 0 |
| 25 | 0 | 1 | 0 | 1 | 0 | 0 | 0 | 0 | 1 |

Figure 7

| Step # of Cal. Seq. | Calibration Routine | | | | | | | | State of Thermal_Trip |
|---|---|---|---|---|---|---|---|---|---|
| | SELA[3:0]# | | | | SELB[3:0]# | | | | |
| **0** | **1** | **1** | **1** | **1** | **0** | **0** | **0** | **0** | **1** |
| 1 | 1 | 1 | 1 | 1 | 0 | 0 | 0 | 1 | 1 |
| 2 | 1 | 1 | 1 | 1 | 0 | 0 | 1 | 0 | 1 |
| 3 | 1 | 1 | 1 | 1 | 0 | 0 | 1 | 1 | 1 |
| 4 | 1 | 1 | 1 | 1 | 0 | 1 | 0 | 0 | 1 |
| 5 | 1 | 1 | 1 | 1 | 0 | 1 | 0 | 1 | 0 |

Figure 8

METHOD AND APPARATUS FOR TRIMMING AN INTEGRATED CIRCUIT

CROSS REFERENCE TO RELATED APPLICATIONS

This application is related to U.S. patent application Ser. No. 09/001,608 entitled, "COMPARATOR," with inventors Jack D. Pippin and Bal S. Sandhu, which is filed concurrently with this application and is hereby incorporated by reference.

BACKGROUND OF THE INVENTION

The invention relates to trimming an integrated circuit, such as a silicon temperature sensor.

The electrical characteristics (e.g., bias voltages and currents) of an integrated circuit typically are functions of parameters of a process that is used to fabricate the circuit. The parameters might include resistivities and threshold voltages, for example, and the process might be, for example, a CMOS process. Engineers typically take into account ideal parameters of the process when designing and laying out the integrated circuit.

The actual electrical characteristics of the circuit should match the designed characteristics. However, quite often, process fabrication variations cause the actual parameters of the process to vary. As a result, the actual electrical characteristics of the integrated circuit are different from the designed characteristics. Although some circuits are designed to have a minimum sensitivity to process variations, other circuits are by their very nature quite sensitive to process variations.

After fabrication, a technique called trimming is typically used to compensate for process variations. For example, the resistance of an integrated resistor (e.g., an n-well resistor) might vary up to fifty percent from the designed value. Referring to FIG. 1, to adjust, or trim, the resistance of a resistor 2 after fabrication, quite often a nonlinear trimming technique is used to adjust the effective resistance of the resistor by selectively coupling trimming resistors 3 (via transistors 4) in parallel with the resistor 2. However, a difficulty with this technique is that the trimming is nonlinear. Therefore, to properly trim the resistor 2, a considerable number of resistors 3 might be needed, and thus, a large amount of die space may be consumed for trimming purposes.

Because each resistor 3 generally consumes a considerable amount of die area (versus a transistor, for example), the above-described trimming technique is quite often limited by the available area in the die. Furthermore, it is quite often difficult to trim the resistance near the desired valve due to the large tolerances of the resistors 3 and the resistance introduced by the channel resistance of the transistor 4. The channel resistance of the transistor 4 is a function of a threshold voltage (typically referred to as $V_T$) which is a process parameter that is also subject to variation.

Referring to FIG. 2, an example of a circuit that is typically sensitive to process variations is a thermal sensor 8. The sensor 8 might, for example, monitor a substrate temperature of a microprocessor. When the temperature exceeds a predetermined threshold temperature (e.g., 100° C.), the sensor 8 alerts other circuitry of the microprocessor so that corrective action (e.g., throttling back or shutting down of the microprocessor) may be taken to reduce the temperature. Without the corrective action, the substrate may overheat, and catastrophic failure of the microprocessor may occur.

The sensor 8 typically must precisely sense the temperature to avoid generating false alarms when the temperature is below the predetermined threshold temperature. These false alarms might slow down or shut down a microprocessor that is otherwise behaving normally.

For purposes of determining when the threshold has been exceeded, the thermal sensor 8 typically has a comparator 10 that electrically compares the temperature of the substrate to the threshold. To accomplish this, the comparator 10 receives a thermal trip point signal (called $V_{REF}$) that electrically represents the predetermined temperature threshold. The comparator 10 also receives a signal (called $V_{SENSE}$) that represents a measured temperature of the substrate. The comparator 10 compares the $V_{REF}$ signal which typically has a positive temperature coefficient with the $V_{SENSE}$ signal which typically has a negative coefficient. Typically, the $V_{SENSE}$ signal is furnished by a diode.

The DC voltage level of the $V_{REF}$ signal typically represents the predetermined temperature threshold. However, this voltage level is sensitive to process variations. As a result, the $V_{REF}$ signal may not accurately represent the threshold, and thus, the overall accuracy of the sensor 8 may be limited by the process variations.

Thus, there is a continuing need for an integrated circuit that allows accurate, post fabrication trimming of the circuit.

SUMMARY OF THE INVENTION

An embodiment of the invention features an integrated circuit which has current sources that are selectably enabled to trim, or adjust, a characteristic (a voltage level, for example) of the integrated circuit.

Generally, in another embodiment, the invention features an integrated circuit that includes circuitry formed by a fabrication process. The circuitry has an actual electrical characteristic (the voltage level of a particular node, for example) that is different from a predetermined electrical characteristic due to a variation in the fabrication process. The actual electrical characteristic is responsive to a level of a current, and a current source of the integrated circuit is configured to be selectably enabled to adjust the level of the current to cause the actual and predetermined electrical characteristics to be substantially equal.

Generally, in another embodiment, the invention features a sensor for monitoring a temperature of a semiconductor substrate. The sensor includes a circuit which is configured to, based on the level of current, furnish a signal that is indicative of a predetermined temperature threshold. The level of the current (and thus, the indication of the temperature threshold) is adjustable by a current source that is configured to be selectably enabled. The sensor also includes a sensing element that is configured to generate another signal that is indicative of the temperature of the substrate. A comparator of the sensor is configured to compare the two signals and indicate the result of the comparison.

Generally, in another embodiment, the invention features a method for use with a semiconductor substrate. The substrate has circuitry, and the circuitry includes current sources. The method includes establishing a temperature of the substrate proximate to a predetermined temperature, and based on a current of the circuitry, an indication of a temperature threshold is formed. Using the circuitry, an indication of the temperature of the substrate is also formed. The indication of the temperature is compared with the indication of the threshold. Based on this comparison, the indication of the threshold is adjusted by selectively enabling the current sources to change the current.

Generally, in other embodiments of the invention, the integrated circuit and the sensor are part of a microprocessor.

Other advantages and features of the invention will become apparent from the following description and from the claims.

BRIEF DESCRIPTION OF THE DRAWING

FIGS. 6, 7 and 8 are charts illustrating use of the digital interface to trim a thermal set point of the sensor.

DETAILED DESCRIPTION

Figure 1:
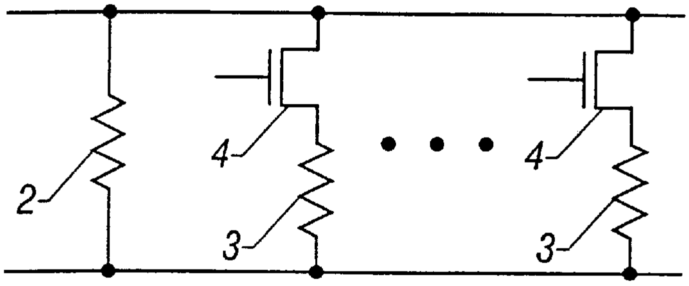
Figure 1 (Prior Art)
FIG. 1 is a schematic diagram of a circuit of the prior art for trimming the resistance of an integrated resistor.
Figure 2:
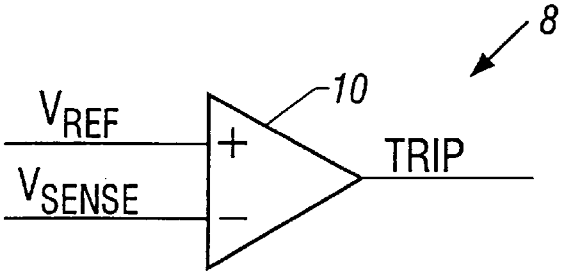
Figure 2 (Prior Art)
FIG. 2 is a schematic diagram of a thermal sensor of the prior art.
Figure 3:
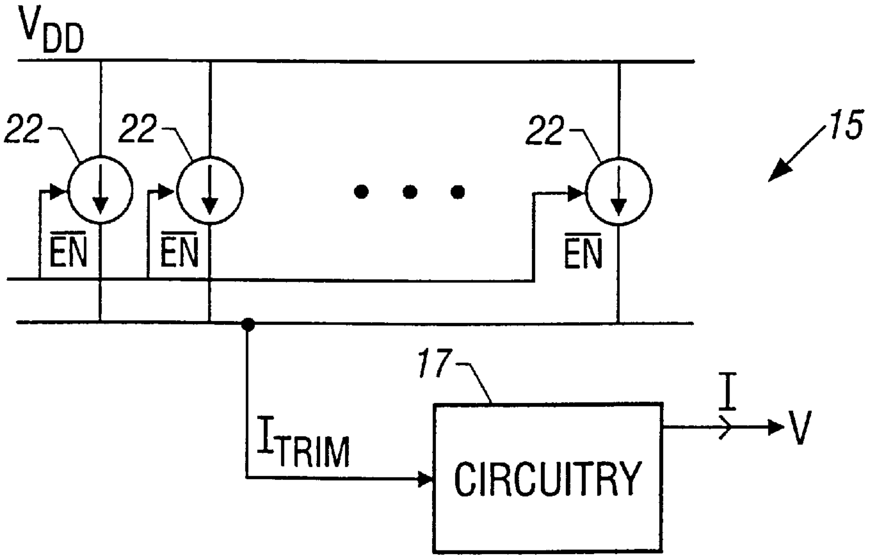
FIG. 3 is a schematic diagram of an integrated circuit having trimming circuitry.

Referring to FIG. 3, circuitry 17 of an integrated circuit 15 has at least one electrical characteristic (e.g., a level of a voltage V or a current I) that is affected by process variations. The process variations cause this electrical characteristic to be different from a desired characteristic. However, the actual electrical characteristic is responsive to a current (called $I_{TRIM}$) and the integrated circuit 15 has current sources 22 that are constructed to be selectably enabled to adjust the level of the $I_{TRIM}$ current to cause the actual characteristic to be substantially equal to the desired characteristic.

This arrangement may provide one or more of the following advantages. The adjustment, or trimming, of the electrical characteristic is linear, and the current furnished by the current source varies only slightly due to process variations. High accuracy trimming is achieved, and electrical calibration of the sensor is performed at one temperature. The trimming of the trip point is precisely controlled, and trimming accuracy is improved.

Figure 4:
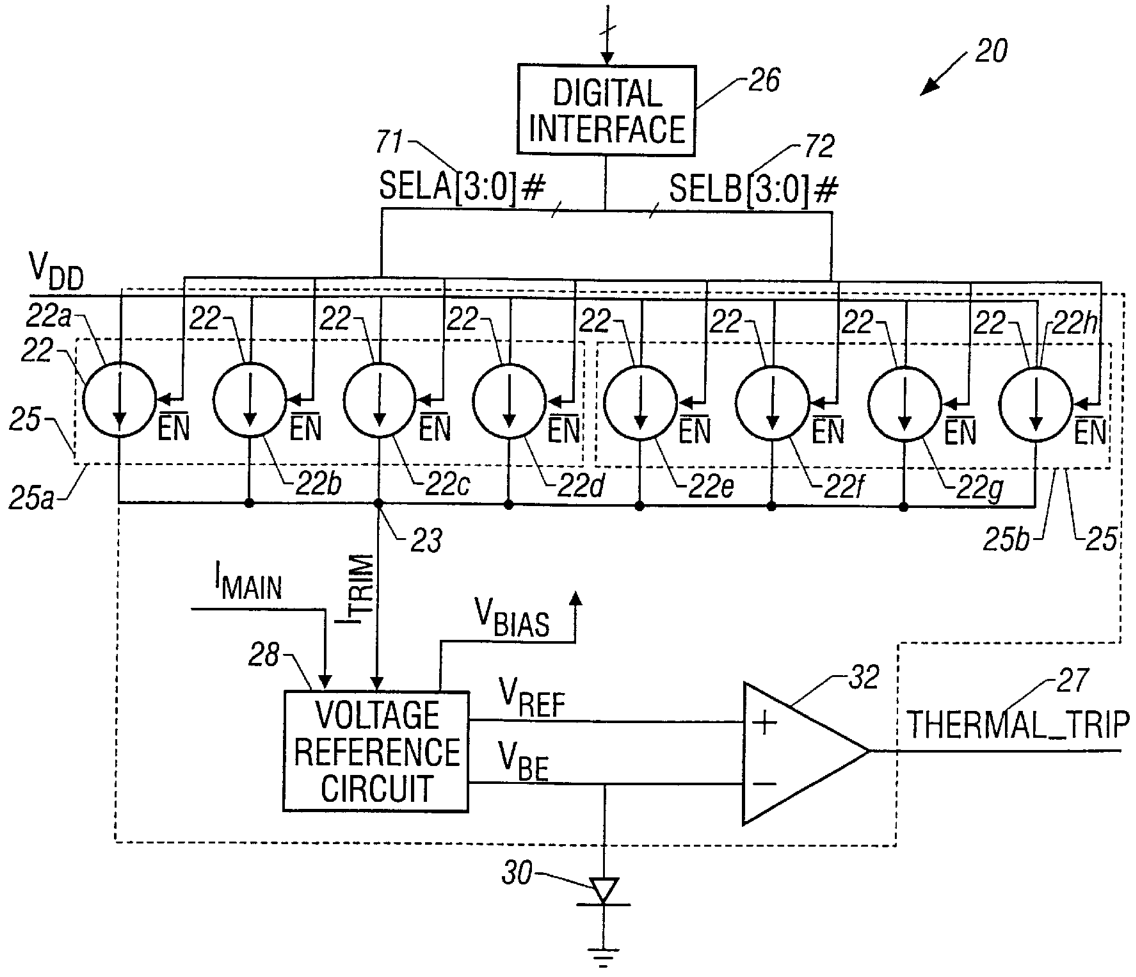
FIG. 4 is a schematic diagram of a thermal sensor.

Referring to FIG. 4, in some embodiments, the circuitry 17 includes a thermal sensor 20 that is constructed to monitor the temperature of a substrate of the integrated circuit 15 and indicate (via a signal called THERMAL_TRIP 27) when the temperature of the substrate exceeds a predetermined temperature threshold. To adjust for process variations, the current sources 22 are constructed to be selectably enabled to adjust a trip point signal (called $V_{REF}$) that electrically represents the temperature threshold of the sensor 20. In this manner, the current sources 22 are selectably enabled/disabled to adjust a DC voltage level of the $V_{REF}$ signal so that the actual temperature threshold of the sensor 20 is proximate to the predetermined temperature threshold.

The assertion of the THERMAL_TRIP signal 27 alerts circuitry (not shown in FIG. 4) of the semiconductor device so that corrective action can be taken. For example, if the integrated circuit is a microprocessor, the corrective action might include adjusting a clock frequency to throttle back or shut down the microprocessor.

To generate the THERMAL_TRIP signal 27, the sensor 20 has a comparator 32 that is constructed to electrically compare a measured temperature of the substrate with the threshold. In this manner, the comparator 32 receives the $V_{REF}$ signal (representing the actual trip threshold of the sensor 20) and a signal (called $V_{BE}$) that is indicative of the temperature of the substrate. The comparator 32 compares the voltage levels of these two signals, and based on the comparison, the comparator 32 either asserts, or drives high, the THERMAL_TRIP signal 27 (to indicate an over temperature condition) or deasserts, or drives low, the THERMAL_TRIP signal 27 (to indicate the temperature is normal).

The $V_{BE}$ signal represents the forward voltage across a pn junction (represented by a diode 30) of the substrate. As typical, the forward potential across a pn junction varies linearly and inversely with respect to temperature. As a result, as the temperature of the substrate rises, the voltage level $V_{BE}$ drops.

The $V_{REF}$ signal is generated by a voltage reference circuit 28 of the sensor 20. The voltage reference circuit 28 is constructed to set the $V_{REF}$ signal at a predetermined trip point voltage level that represents the electrical equivalent of the threshold inside the sensor 20. However, due to variations in the process used to fabricate the sensor 20, the voltage level of the $V_{REF}$ signal deviates from the predetermined trip point voltage level.

For purposes of calibrating, or trimming, the sensor 20 to adjust the voltage level of the $V_{REF}$ signal to the predetermined trip point voltage level, the voltage reference circuit 28 is constructed to receive the trim current (called $I_{TRIM}$) and a main current (called $I_{MAIN}$) The $I_{TRIM}$ current is collectively furnished by the current sources 22 that are enabled. The voltage reference circuit 28 tracks changes in the level of the $I_{TRIM}$ current by making corresponding linear adjustments in the voltage level of the $V_{REF}$ signal.

One of the current sources 22 is enabled to increase the level of the $I_{TRIM}$ current, and likewise, one of the current sources 22 is disabled to decrease the level of the $I_{TRIM}$ current. In some embodiments, the sensor 20 is designed for the voltage level of the $V_{REF}$ signal to be equal to the predetermined trip point voltage level when some of the current sources 22 are enabled. As a result, when the sensor 20 is calibrated, the current sources 22 that were designed to be enabled might be disabled to lower the voltage level of $V_{REF}$ signal to the predetermined trip point voltage level.

Because the $V_{REF}$ signal is coupled to a non-inverting input terminal of the comparator 32 and the $V_{BE}$ is coupled to an inverting input terminal of the comparator 32, increasing the level of the $I_{TRIM}$ current (i.e., increasing the voltage level of the $V_{REF}$ signal) effectively lowers the actual temperature threshold of the sensor 20. Decreasing the level of the $I_{TRIM}$ current (i.e., decreasing the voltage level of the $V_{REF}$ signal) effectively raises the actual temperature threshold of the sensor 20.

The $I_{TRIM}$ current flows from a node 23 that is coupled to receive current from up to all eight of the current sources 22. The current sources 22 are arranged in two banks 25*a* (i.e., current sources 22*a*, 22*b*, 22*c* and 22*d*) and 25*b* (i.e., current sources 22*e*, 22*f*, 22*g* and 22*h*). In some embodiments, the sensor 20 is designed for the voltage level of the $V_{REF}$ signal to be at the predetermined trip point voltage level when the current sources 22 of the bank 25*a* are enabled and the current sources of the bank 25*b* are disabled.

When calibrating the sensor 20, if the temperature threshold of the sensor 20 is too high, some of the current sources 22 of the bank 25*a* are enabled to increase the actual temperature threshold of the sensor. If the thermal set point is too low, some of the current sources 22 of the bank 25*b* are disabled to decrease the actual temperature threshold of the sensor 20.

In some embodiments, each current source 22, when enabled, furnishes the same, predetermined level (e.g., 1 uA) of current. As a result, because the temperature threshold of the sensor 20 varies linearly with the level of the $I_{TRIM}$ current, for each current source 22 enabled or disabled, the actual temperature threshold of the sensor 20 changes by a predetermined temperature unit (e.g., 1° C.).

In other embodiments, each current source 22 of each bank 25 is constructed to provide a different level of current. For example, in some embodiments, the current levels furnished by current sources 22 of each bank 25 are weighted to implement a 8-4-2-1 binary weighting scheme. In these embodiments, the current sources 22 supply a multiple of a predetermined current Io (e.g., 1 ua). For example, for the bank 25*a*, the current source 22*c*, when enabled, furnishes twice as much current (2Io) as the current source 22*d* (which furnishes a current Io, when enabled). The current source 22*b*, when enabled, furnishes four times (4Io) as much current as the current source 22*d*, and the current source 22*a*, when enabled, furnishes eight times as much current (8Io) as the current source 22*d*. The current sources 22 of the bank 25*b* have a similar design.

In the rest of the description, it is assumed that the current sources 22 of the banks 25*a* and 25*b* implement the 8-4-2-1 binary weighting scheme, and before calibration, the temperature threshold of the sensor 20 is designed assuming all current sources 22 of the bank 25*b* are enabled and all current sources of the bank 25*a* are disabled. However, other embodiments are within the scope of the appended claims.

During a test mode of the integrated circuit 15, a digital interface 26 is used to calibrate the sensor 20 to adjust the actual threshold temperature of the sensor 20 to the desired predetermined threshold. In this manner, the interface 26 is used to enable/disable the current sources 22 pursuant to a predetermined calibration sequence to determine which current sources 22 need to be permanently enabled/disabled to achieve the desired set point voltage level.

The interface 26 supplies two sets of four bit signals called SELA[3:0]# 71 and SELB[3:0]# 72. Each different bit of the SELA[3:0]# 71 and SELB[3:0]# 72 signals is uniquely coupled to one of the current sources 22 and is used to selectably enable (when the output is low) and disable (when the output is high) that current source 22.

The bits of the SELA[3:0]# signal 71 control the enablement/disablement of the current sources 22 of the bank 25*a*. The bits of the SELA[3:0]# signal 71 are coupled to the current sources 22 of the bank 25*a* in a hierarchical order so that the more significant bits of the SELA[3:0]# 71 signal are coupled to the current sources 22 that supply more current. In this manner, the SELA[3]#, SELA[2]#, SELA [1]# and SELA[0]# bits are coupled to the current sources 22*a*, 22*b*, 22*c* and 22*d*, respectively.

The bits of the SELB[3:0]# signal 72 control the enablement/disablement of the current sources 22 of the bank 25*b*. Similar to the connections of the bits of the SELA[3:0]# signal 71 to the current sources 22 of the bank 25*a*, the bits of the SELB[3:0]# signal 72 are coupled to the current sources 22 of the bank 25*b* in a hierarchical fashion so that the more significant bits of the SELB[3:0]# signal 72 are coupled to the current sources 22 that supply more current.

Thus, due to the above-described arrangement, the current sources 22 of each bank 25 collectively function as a digital-to-analog (D/A) converter by converting the SELA [3:0]# 71 and SELB[3:0]# 72 signals into respective analog, output currents that are combined at the node 23 to form the $I_{TRIM}$ current. As a result, each time the value of the SELA[3:0]# 71 or SELB[3:0]# 71 signal changes by one, the level of the $I_{TRIM}$ current changes by a predetermined amount. As examples of this conversion, when the SELA [3:0]# signal 71 equals "1111b" and the SELB[3:0]# signal 72 equals "1110b" (wherein the suffix "b" denotes a binary representation), the current sources 22 set the level of the $I_{TRIM}$ current equal to a predetermined current Io. When the SELA[3:0]# signal 71 equals "1111b" and the SELB[3:0]# signal 72 equals "0111b," the current sources 22 set the level of the $I_{TRIM}$ current equal to 8Io.

It possible to measure the voltage $V_{REF}$ via a test pad to verify the temperature trip point of the sensor 20. However, placing a test probe on the test pad might upset the actual trip point, and the test pad may act as an antenna and undesirably inject noise at the input of the comparator 22.

Figure 5:
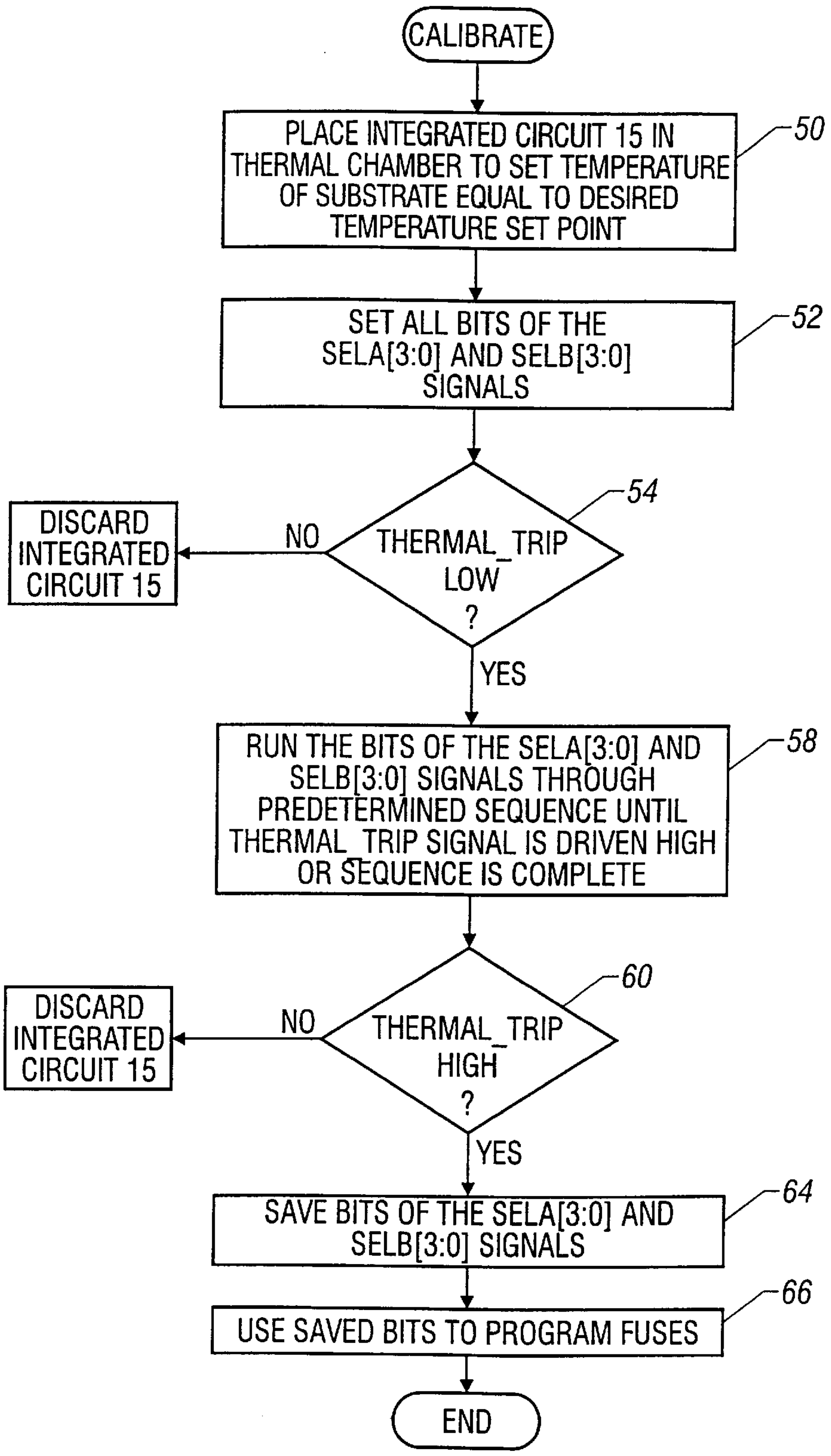
FIG. 5 is a flow diagram illustrating a routine to trim a thermal set point of the thermal sensor.

Another way to indirectly measure the predetermined thermal threshold is to establish the temperature of the substrate near the desired, predetermined thermal threshold (e.g., 100° C.). Referring to FIG. 5, in this manner, in a calibration routine, the wafer (containing the sensor 20) is placed (block 50) in a thermal chamber. The temperature of the chamber is near the temperature of the desired, predetermined thermal threshold. Alternatively, the wafer may be placed on a chuck that has a temperature near the predetermined thermal threshold.

After the wafer has been placed in the chamber for a predetermined time (e.g., 2 min.), the wafer is ready for testing. This testing is performed before other tests (e.g., tests that involve the execution of instructions) are performed that would cause heating of the substrate. During testing, the temperature of the chuck is maintained near the desired, predetermined temperature threshold.

Electrical testing of the sensor 20 then begins as all bits of the SELA[3:0] signal (the inverse of the SELA[3:0]# signal) and the SELB[3:0] signal (the inverse of the SELB [3:0]# signal) are set high (block 52).

Next, a determination is made (block 54) whether the THERMAL_TRIP signal 27 is low. If not, then the current sources 22 cannot be used to adjust the actual temperature threshold of the sensor 20, and the die containing the integrated circuit 15 is marked as being defective. If the THERMAL_TRIP signal 27 is low (as it should be for a non-defective part), then, the bits of the SELA[3:0] and SELB[3:0] are changed (block 58) pursuant to a calibration sequence.

In the calibration sequence, the values of the SELA[3:0] and SELB[3:0] signals are changed until either the THERMAL_TRIP signal 27 is driven high (indicating the sensor 20 has been calibrated) or the calibration sequence has reached its end. In this manner, a determination is made (block 60) whether the sequence completed without the THERMAL_TRIP signal 27 being asserted. If so, then the die containing the sensor 20 is marked as being defective.

If values for the SELA[3:0] and SELB[3:0] signals are found that cause the THERMAL_TRIP signal 27 to be asserted, then these values are saved (block 64) and used to program fuses (block 66) to permanently enable/disable the current sources 22, as described below.

In some embodiments, the calibration sequence includes holding the bits of the SELA[3:0]# and SELB[3:0]# signals equal to "1111b" and decrementing the value of the SELB [3:0]# signal by one until, if necessary, the SELB[3:0]# signal equals "0000b." Upon this occurrence, the SELB [3:0]# signal is held equal to "0000b" while the value of the SELA[3:0]# signal is decremented by one until, if necessary, the SELA[3:0]# signal equals "0000b".

Referring to FIG. 6, in a first scenario, the steps of the calibration sequence are shown where process variations do not cause the actual temperature threshold of the sensor 20 to vary from the desired threshold. As a result, the THERMAL_TRIP signal 27 is asserted at the midpoint of the calibration sequence when the SELB[3:0]# signal 72 is equal to "0000b" and the SELA[3:0]# signal 71 is equal to "1111b," i.e., all of the current sources 22 of the bank 25*a* are disabled and all of the current sources 22 of the bank 25*b* are enabled.

Referring to FIG. 7, in a second scenario, steps of the calibration sequence are shown where the actual temperature threshold of the sensor 20 is ten degrees higher that the desired value. In this scenario, the SELA[3:0]# signal is incremented until the SELA[3:0]# signal equals "0101b." At this point, the sensor 20 asserts the THERMAL_TRIP signal 27 which indicates that calibration has been achieved with the last previous value that was loaded.

Referring to FIG. 8, in a third scenario, fewer steps of the sequence of the calibration sequence are used because the actual trip point is five degrees lower than the designed value. In this scenario, the SELB[3:0]# signal is incremented until the SELB[3:0]# signal equals "0101b." i.e., until the SELB[3:0]# signal 72 equals "1010b." At this point, the sensor 20 deasserts the THERMAL_TRIP signal 27 which indicates that calibration has been achieved with the last previous value that was loaded.

Figure 9:
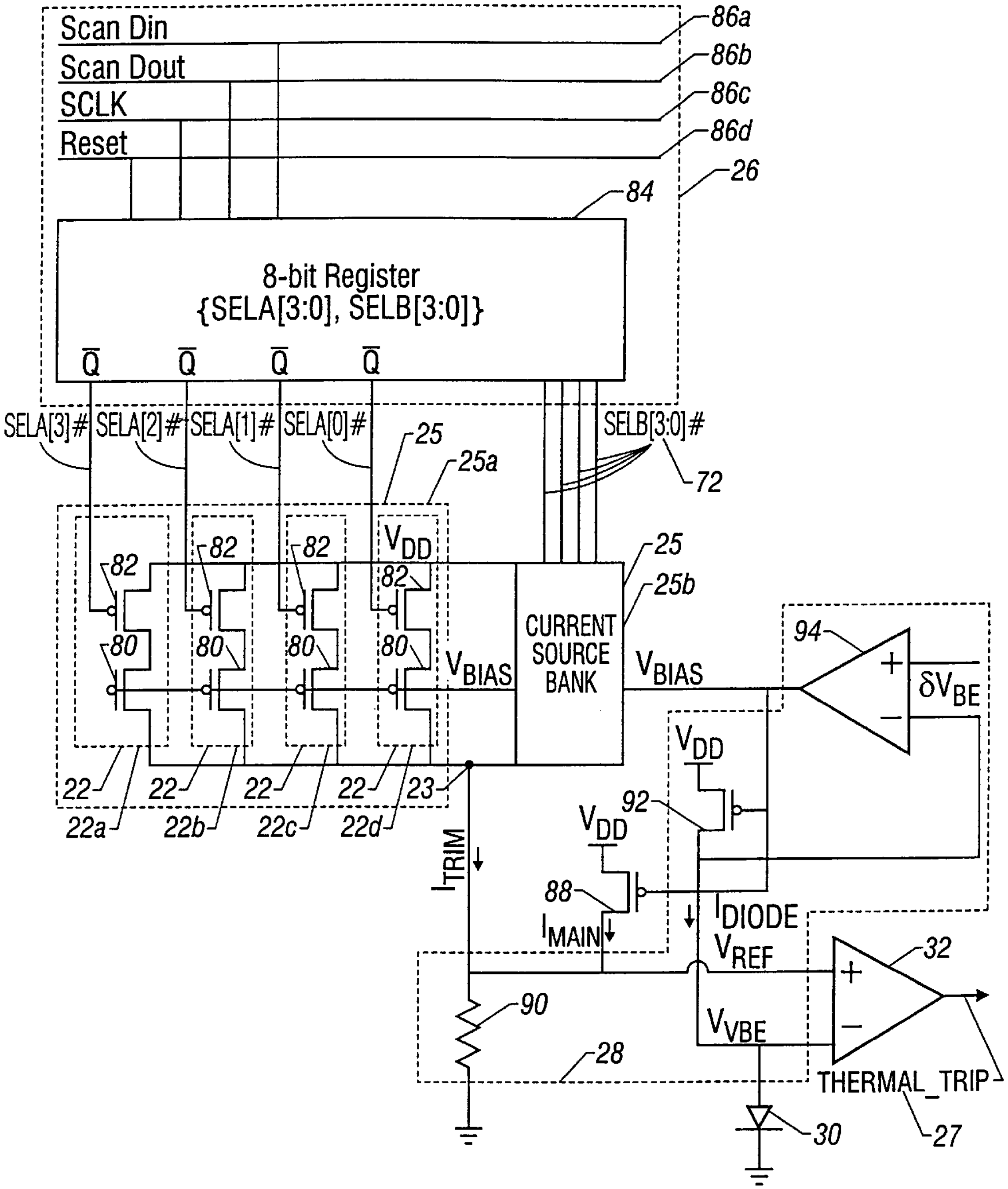
FIG. 9 is a more detailed schematic diagram of the sensor of FIG. 4.

Referring to FIG. 9, each current source 22 includes a p-channel metal-oxide-semiconductor (PMOS) transistor 80 that has a source-drain path which is serially coupled to the source-drain path of a PMOS selection transistor 82. The transistor 80 receives a bias voltage (called $V_{BIAS}$) at its gate and is coupled in a current mirror arrangement with the other transistors 80 of the other current sources 22, as the other transistors 80 have their sources coupled to the $V_{DD}$ supply voltage level. The $V_{BIAS}$ voltage establishes the current flowing through the source-drain path of the transistor 80 when the current source 22 is enabled. The aspect ratios of the transistors 80 of each bank 25 are scaled to implement the 8-4-2-1 binary weighting scheme.

The drain of the selection transistor 82 is coupled to the source of the transistor 80, and the source of the transistor 82 is coupled to a voltage supply level called $V_{DD}$. The selection transistor 82 receives one of the bits of the SELA [3:0]# or SELB[3:0]# signals. When the bit is low, the source-drain path of the transistor 82 conducts which permits current to flow through the source-drain path of the transistor 80.

The voltage reference circuit 28 uses a bandgap reference circuit which minimizes thermal drift of the reference circuit 28 by compensating the positive drift temperature coefficient of a resistor 90 (e.g., an n-well resistor) with the negative drift temperature coefficient of the diode 30 (i.e., the pn junction).

The voltage $V_{REF}$ signal is provided by the voltage drop across the resistor 90. The resistor 90 is coupled between the node 23 and ground. Current flowing through the resistor 90 is furnished both by the $I_{TRIM}$ current and a main current (called $I_{MAIN}$). The $I_{MAIN}$ current is furnished by a PMOS transistor 88. The source-drain path of the transistor 88 is coupled between the supply voltage $V_{DD}$ and the node 23, and the gate of the transistor 88 receives the voltage $V_{BIAS}$.

A PMOS transistor 92 of the circuit 28 furnishes a current (called $I_{DIODE}$) to forward bias the diode 30 (i.e., to forward bias the pn junction). The source of the transistor 92 is coupled to the supply voltage $V_{DD}$, and the drain of the transistor 92 is coupled to the anode of the diode 30.

An amplifier 94 of the circuit 28 has a common mode configuration. An inverting input terminal of the amplifier 94 is coupled to the drain of the transistor 92, and the non-inverting input of the amplifier 94 is coupled to the anodes of forward biased diodes (not shown) that have their cathodes coupled to ground. These diodes have a similar design to the diode 30. Based on the voltage difference between the non-inverting and inverting input terminals, the amplifier 94 furnishes the $V_{BIAS}$ voltage. The comparator 32 compares the voltage levels of the $V_{REF}$ and $V_{BE}$ signals to generate the THERMAL_TRIP signal 27 at its output terminal.

The digital interface 26 includes an eight bit register 84 that stores the SELA[3:0] signal (in the four most significant bits) and the SELB[3:0] signal (in the four least significant bits). The inverting outputs of the register 84 generate the SELA[3:0]# and SELB[3:0]# signals. The interface 26 also includes data and control lines that are coupled to the register 84. Data is loaded into and retrieved from the register 84 via a serial scan chain arrangement. In this manner, the register 84 is serially linked to other test registers by a scan data input line 86*a* and a scan data output line 86*b*. The register 86 is also coupled to a clock line 86*c* and a reset line 86*d*.

Figure 10:
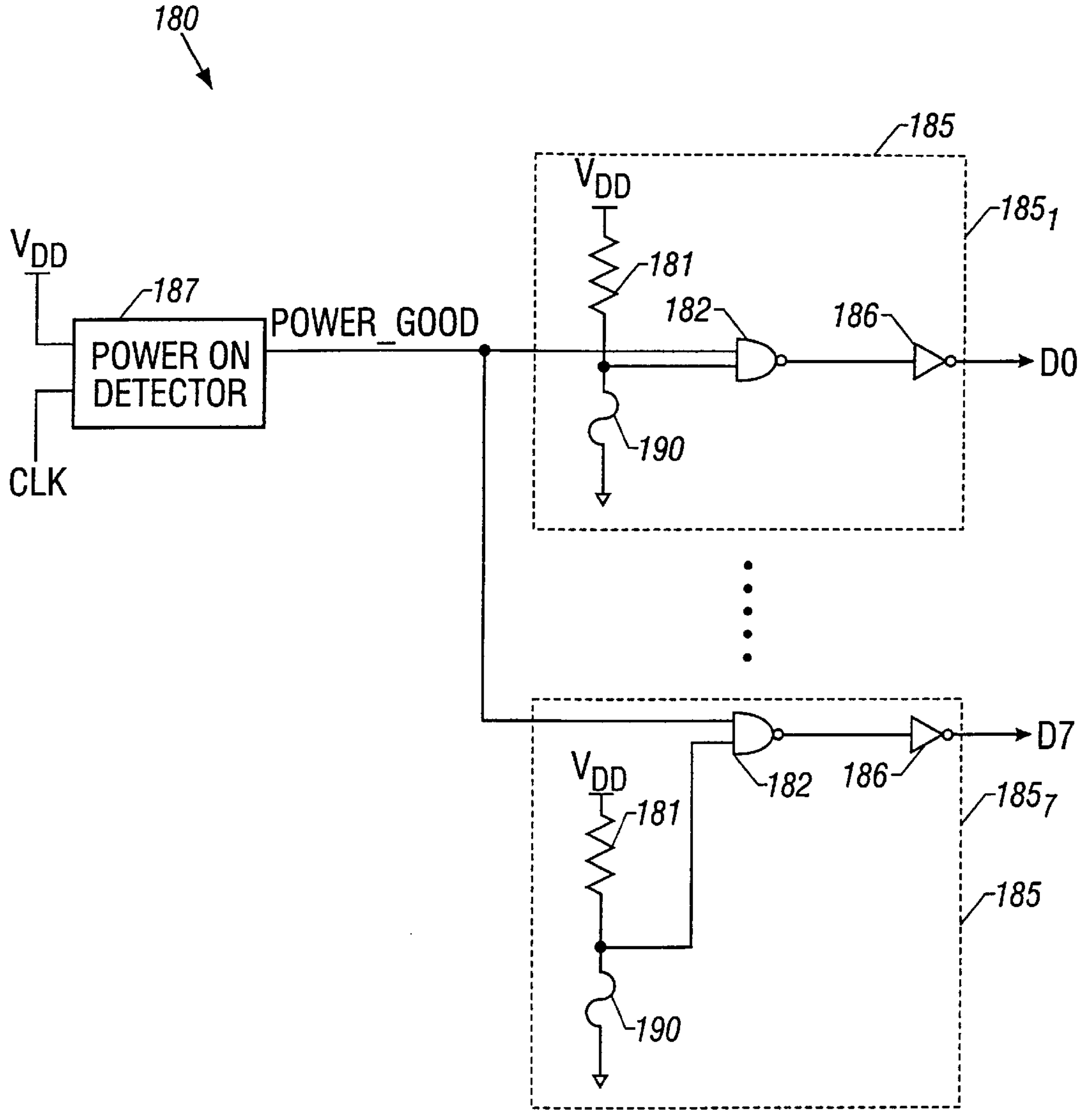
FIG. 10 is a schematic diagram of a fuse circuit used to permanently enable selected current sources.

Referring to FIG. 10, to permanently enable/disable the current sources 22, in some embodiments, the integrated circuit 15 includes a fuse circuit 180 that used to permanently set the bits of the register 84. The fuse circuit 180 includes circuits 185 (i.e., circuits $\mathbf{185}_1$ . . . $\mathbf{185}_7$). Each different circuit 185 is constructed to set the logic level of a different bit of the register 84.

To accomplish this, each circuit 185 has a fuse 190 that is blown to permanently set the associated bit of the register 84 to a logic one value. If the fuse 190 is left intact, the associated bit has a logic zero value. The fuse 190 is coupled to the $V_{DD}$ supply voltage level through a pull-up resistor 181.

The junction of the resistor 181 and the fuse 190 furnishes a signal to the input terminal of a NAND gate 182. Another input terminal of the NAND gate 182 receives a POWER_GOOD signal from a power on detector circuit 187. The circuit 187 drives high, or asserts, the POWER_GOOD signal when the chip is powered up and deasserts, or negates, the POWER_GOOD signal otherwise. An inverter 186 is serially coupled to an output terminal of the NAND gate 182 and provides an output signal representative of one of the bits of the register 84. Thus, when the POWER_GOOD signal is asserted, the values of the bits of the register 84 are dependent on the states of the associated fuses 190.

Other embodiments are possible for the fuse circuit 180. For example, the fuses used to enable/disable the current sources 22 might be part of a fuse memory. In this arrangement, the values from the fuse memory are permanently loaded into the register 84 when the integrated circuit 15 is in the non-test mode.

Figure 11:
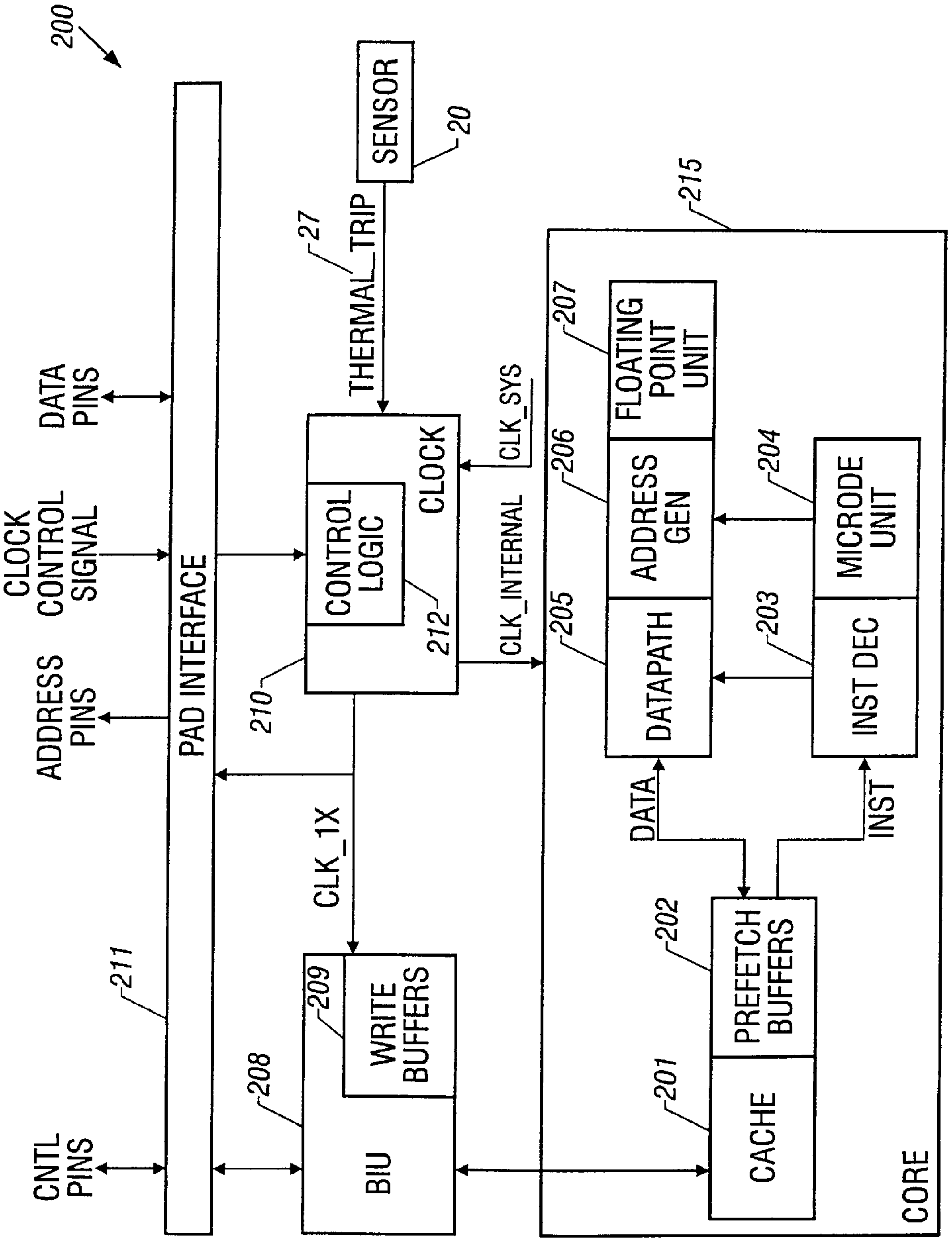
FIG. 11 is a schematic diagram of a microprocessor.

Referring to FIG. 11, the sensor 20 can be used to monitor temperature in many different types of integrated circuits. For example, the integrated circuit 15, in some embodiments, is a microprocessor 200.

The microprocessor 200 includes a processing core 215 that processes data of a computer system. The core 215 includes a cache 201, prefetch buffers 202, an instruction decoder 203, a microcode unit 204, datapath circuitry 205, an address generator 206 and a floating point unit 207. The cache 201 stores instructions and data for execution by the microprocessor 200. The prefetch buffers 202 retrieve data and instructions for execution by the microprocessor 200. The buffers 202 retrieves the data and instructions either from the cache 201 or if a cache miss occurs, from a memory of the computer system via a bus interface unit 208.

The instruction decoder 203 retrieves and decodes the instructions from the prefetch buffers 202. The microcode unit 204 has a memory that stores microcode instructions for the microprocessor 200. The microcode unit 204 interacts with the instruction decoder 203 to execute the instructions. To carry out execution of the instructions, the microcode unit 204 provides the address generator 206 with address information which the address generator 206 uses to generate addresses necessary to carry out the execution of the instructions. In a similar manner, the address generator 206 generates addresses for the datapath circuitry 205 and the floating point unit 207.

The microcode unit 204 is also responsible for instruction boundary processing, such as interrupt/exception arbitration, and the halting of the instruction decoder 203 when necessary. The microcode unit 204 also handles cache 201 misses.

The datapath circuitry 205 provides the main execution data path for the microprocessor 200. The datapath circuitry 205 includes an arithmetic logic unit (ALU), control registers, a barrel shifter, read only memory (ROM) and flags. The datapath circuitry 205 retrieves data from the prefetch buffers 202. The datapath circuitry 205 executes microcode provided by the instruction decoder 203 using data received from the prefetch buffers 202 according to the addresses generated by the address generator 206. The floating point unit 207 is used in the execution of floating point instructions.

Outside of the processing core 215, the microprocessor 200 has the bus interface unit 208, a pad interface 211, and a clock generator 210. The bus interface unit 208 provides an interface between internal buses of the microprocessor 200 and external buses that are used to fetch data and instructions from a memory of the computer system. The bus interface 208 has write buffers 209 that are used to stores data to be transferred from the microprocessor 200 to the rest of the computer system. The pad interface 211 provides a pin interface for control, address and data signals passed between the microprocessor 200 and the rest of the computer system.

The clock generator 210 receives a system clock signal (called CLK_SYS) and uses the CLK_SYS to generate clock signals for the microprocessor 200. The clock generator 210 furnishes a clock signal (called CLK_1X) to the bus interface unit 208 and the pad interface 211. When the microprocessor 200 is not overheating (as indicated by the deassertion of the THERMAL_TRIP signal 27), the CLK_1X signal has the same frequency as the CLK_SYS signal, and portions of the bus interface unit 208 that interact with the pad interface 211 use the CLK_1X signal.

The clock generator 210 furnishes another clock signal (called CLK_INTERNAL) to the processing core 215. The CLK_INTERNAL signal is synchronized to the CLK_SYS signal and has a frequency that is a multiple (e.g., a multiple of two) of the frequency of the CLK_SYS signal. As a result, when the microprocessor 200 is operating under normal conditions, the processing core 215 generally operates at a higher frequency than the rest of the computer system.

Control logic 212 of the clock generator 210 receives the THERMAL_TRIP signal 27. When the THERMAL_TRIP signal 27 is asserted, the control logic 212, depending on its configuration, alters the frequency of the CLK_INTERNAL signal to slow down the processing core 215 and reduce thermal buildup in the substrate of the microprocessor 200. In this manner, when the THERMAL_TRIP signal 27 is asserted, the control logic 212 either throttles back the frequency of the CLK_INTERNAL signal or temporarily halts the CLK_INTERNAL signal.

In some embodiments, the clock generator 210 stops the microprocessor 200 for a predetermined duration (e.g., 50 us) when the substrate overheats to allow the microprocessor 200 to cool down. Afterwards, the clock generator 210 allows operations of the microprocessor 200 to start again for a predetermined duration (e.g., 50 us). At the end of this duration, the clock generator 210 checks the state of the THERMAL_TRIP signal 27, and if the THERMAL_TRIP signal 27 is asserted, the on/off cycle is repeated.

Examples of possible implementations of the clock generator 210 are further described in U.S. Pat. Nos. 5,537,581 and 5,546,568, which are hereby incorporated by reference.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A sensor for monitoring a temperature of a semiconductor substrate, comprising:

a sensing element furnishing a first signal indicative of the temperature;

a circuit having a current and configured to generate, based on a level of the current, a second signal indicative of a temperature threshold;

a current source configured to be selectably enabled to adjust the level of the current; and a comparator configured to compare the first and second signals and indicate the result of the comparison.

2. The sensor of claim 1, wherein the current source comprises:

a first transistor having a current path and a control terminal, the first transistor configured to receive a bias voltage at the control terminal and furnish a predetermined current via the current path, a level of the predetermined current based on the bias voltage; and a second transistor configured to couple the current path of the first transistor to the circuit when the current source is enabled.

3. The sensor of claim 1, wherein the current source is one of a plurality of current sources coupled to the circuit, each of the plurality of current sources configured to be selectably enabled to adjust the level of the current.

4. The sensor of claim 1, further comprising:

a fuse connected to select whether the current source is enabled or disabled.

5. A method for monitoring a temperature of a semiconductor substrate, comprising:

generating a voltage indicative of the temperature;

defining a thermal threshold based on the level of a current;

selectively enabling a current source to adjust the level of the current;

comparing the voltage and the threshold; and generating a signal indicative of a result of the step of comparing.

6. A method for monitoring a temperature of a semiconductor substrate, the substrate having circuitry and the circuitry including current sources, comprising:

establishing a temperature of the substrate near a predetermined temperature;

based on a current of the circuitry, forming a temperature threshold indication;

forming an temperature indication of the temperature using the circuitry;

comparing the temperature indication with the temperature threshold indication; and based on the step of comparing, adjusting the temperature threshold indication by selectively enabling the current sources to change the current.

7. The method of claim 6, wherein the act of adjusting includes:

enabling the current sources in a predefined sequence until the temperature threshold indication is substantially near the indication of the temperature.

8. The method of claim 7 further comprising:

based on the current sources that are enabled when the temperature threshold indication is near the indication of the temperature, programming fuses to permanently select said current sources that are enabled.

9. A sensor for monitoring a temperature of a semiconductor substrate, comprising:

a junction formed in the substrate and furnishing a junction voltage indicative of the temperature;

a voltage reference circuit having a current and being configured to furnish a reference voltage based on the level of the current;

current sources coupled to the circuit, each current source configured to be selectively enabled to increase a level of the current; and a comparator configured to indicate the result of a comparison between the junction and reference voltages.

10. The sensor of claim 9, wherein each current source comprises:

a first transistor having a current path and a control terminal, the first transistor configured to receive a bias voltage at the control terminal and furnish a predetermined current via the current path, a level of the predetermined current based on the bias voltage; and a second transistor configured to couple the current path of the first transistor to the circuitry when the current source is enabled.

11. The sensor of claim 3, wherein at least one of the current sources is adapted to furnish more current than at least one of the other current sources.

12. The sensor of claim 3, wherein each current source is further adapted to contribute to the level of the current when enabled, and the contributions of the current sources are binarilly weighted with respect to each other.

13. The sensor of claim 1, wherein the circuit comprises a voltage reference circuit.

14. The method of claim 5, further comprising:

selectably enabling additional current sources to adjust the level of the current.

15. The sensor of claim 9, wherein at least one of the current sources is configured to furnish more current than at least one of the other current sources.

16. The sensor of claim 9, wherein each current source is further adapted to contribute to level of the current when enabled, and the contributions of the current sources are binarily weighted with respect to each other.

17. The sensor of claim 9, further comprising:

fuses connected to select whether the current sources are permanently enabled or disabled.

18. A sensor for monitoring a temperature of a semiconductor substrate, comprising:

a sensing element furnishing a first signal indicative of the temperature;

a circuit having a current and to generate, based on a level of the current, a second signal indicative of a temperature threshold;

a current source to be sclectably enabled to adjust the level of the current, wherein the current source comprises:

a first transistor having a current path and a control terminal, the first transistor to receive a bias voltage at the control terminal and furnish a predetermined current via the current path, a level of the predetermined current based on the bias voltage; and a second transistor to couple the current path of the first transistor to the circuitry when the current source is enabled.

19. The sensor of claim 18, wherein the current source is one of a plurality of current sources coupled to the circuit, and each of the plurality of current sources is selectably enabled to adjust the level of the current.

20. The sensor of claim 19, wherein at least one of the current sources furnishes more current than at least one of the other current sources.

21. The sensor of claim 19, wherein each current source contributes to the level of the current when enabled, and the contributions of the current sources are binarilly weighted with respect to each other.

22. The sensor of claim 18, further comprising:

a fuse to select whether the current source is enabled or disabled.

23. The sensor of claim 18, wherein the circuit comprises a voltage reference circuit.

* * * * *

UNITED STATES PATENT AND TRADEMARK OFFICE

CERTIFICATE OF CORRECTION

PATENT NO. : 6,006,169

DATED : 12/21/99

INVENTOR(S) : Bal S. Sandhu, Jack D. Pippin and Edward A. Burton

It is certified that error appears in the above-identified patent and that said Letters Patent is hereby corrected as shown below:

In col. 12, line 29, replace "sclectably" with --selectably--.